(12) United States Patent
Enomoto et al.

(10) Patent No.: US 6,943,475 B2
(45) Date of Patent: Sep. 13, 2005

(54) PERMANENT MAGNET MOTOR FOR DRIVING A FAN

(75) Inventors: Yuji Enomoto, Hitachi (JP); Osamu Sekiguchi, Ryugasaki (JP); Hitoshi Ishii, Aioi (JP); Katsuo Kawashima, Aioi (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 10/776,262

(22) Filed: Feb. 12, 2004

(65) Prior Publication Data

US 2004/0160139 A1 Aug. 19, 2004

(30) Foreign Application Priority Data

Feb. 17, 2003 (JP) ........................................ 2003-037766

(51) Int. Cl.[7] ............................ H02K 21/12; H02K 1/18
(52) U.S. Cl. ............................ 310/156.45; 310/156.45; 417/423.12
(58) Field of Search .................... 310/156.38, 156.43, 310/156.44, 156.45, 156.46; 417/423.12, 423.14, 423.7

(56) References Cited

U.S. PATENT DOCUMENTS

| | | | | |
|---|---|---|---|---|
| 3,842,300 A | * | 10/1974 | Daykin et al | 310/216 |
| 4,015,154 A | * | 3/1977 | Tanaka et al. | 310/42 |
| 4,694,210 A | * | 9/1987 | Elliott et al. | 310/68 R |
| 5,407,283 A | * | 4/1995 | Ohtsuka et al. | 384/130 |

FOREIGN PATENT DOCUMENTS

| | | | | |
|---|---|---|---|---|
| JP | 2-211043 | * | 8/1990 | 310/154 |
| JP | 8-70550 | | 3/1996 | |
| JP | 2001-231192 | | 8/2001 | |

* cited by examiner

*Primary Examiner*—Tran Nguyen
(74) *Attorney, Agent, or Firm*—Dickstein Shapiro Morin & Oshinsky LLP

(57) ABSTRACT

A permanent magnet motor for driving a fan is rotated while a movement of the rotor in a direction of thrust of a rotary shaft with a rotation of the fan is prevented by magnetic attraction force of a permanent magnet and a stator core. A surface magnetic flux density of the permanent magnet facing the stator core is lower at an end portion than at a central portion of the permanent magnet in the direction of thrust of the rotary shaft.

7 Claims, 5 Drawing Sheets

MAGNETIC FLUX DENSITY
MEASURING POSITION

FEM ANALYSIS MODEL

PERMANENT MAGNET MOTOR FOR DRIVING A FAN

BACKGROUND OF THE INVENTION

1. Field of the Invention

This invention relates to a small fan motor such as an ordinary fan motor and a disk drive motor.

2. Description of the Related Art

The fan motor is generally used for cooling or blowing devices. The fan motor is required to be high in efficiency and also low in vibration and noises. Normally, to reduce the vibration and noises, a mold motor is employed for the purpose of increasing the mechanical rigidity of the motor and reducing the transfer of the electromagnetic vibration generated by the motor. JP-A-2001-231192 discloses a mold motor in which the entire stator core including the winding of the motor is molded so that resin is filled between the stacked cores thereby to reduce the transfer of the electromagnetic vibration generated by the stator core.

Another conventional method of reducing the vibration and noises is disclosed in JP-A-8-70550. In this motor, the assembly accuracy between the stator and the bearing unit and between the shaft and the rotor, the accuracy and the assembly accuracy of the parts are improved to suppress the vibration due to the wobbling generated from the error thereby to reduce the vibration and noises of the motor as a whole.

In the conventional motors described above, the unique values of each motor can be changed by molding the motor and increasing the mechanical rigidity of the whole motor. In these conventional motors, however, the resonant point is simply transferred to another frequency band, and the vibration source of the motor is not affected. Therefore, the problem vibration and noises are still generated as far as the relation with the housing for mounting the motor is concerned. With regard to the improved accuracy, on the other hand, the electro-magnetic vibration generated by the motor itself remains equivalent. Therefore, the problem vibration and noises are generated by the resonance achieved in view of the fact that the electromagnetic vibration of the stator has the natural frequency of the system according to the manner in which the housing is mounted.

In recent years, a product set with a fan motor built therein is required to have a highly efficient motor and a reduced size to reduce the power consumption. For this purpose, the efforts are made to improve the winding occupancy rate, reduce the size using the optimum design technique and employ the highly efficient design. An improved motor efficiency is accompanied by a higher output such as a higher torque or a higher rotational speed under the same input conditions. Therefore, the electromagnetic vibration constituting the source of the vibration and noises is correspondingly increased. On the other hand, the product set is required to produce a smaller vibration and noises than the predecessors, and therefore the electromagnetic vibration generated from the motor is required to be reduced.

SUMMARY OF THE INVENTION

An object of this invention is to solve a problem described above and to provide a fan motor high in efficiency and small in electromagnetic vibration, in which the required output is secured with a reduced vibration and noise according to the shape of the rotor magnet of the fan motor.

In order to achieve the object described above, according to this invention, taking note of the axial vibration of the fan motor, there is provided a method of reducing the axial vibration of rotation generated in the motor providing an axial vibration source. The fan motor is rotated normally at high speed, and thus has the function of generating the wind by rotating the fan (vane) mounted on the shaft of the motor rotor. With the occurrence of the wind, the vane receives the reaction of the wind generated and is subjected to the thrust force in the direction opposite to the direction of the wind. Due to this thrust force, the rotor loses the balance thus far maintained at the magnetic center with the stator. The rotor thus applies a force in the direction opposite to the thrust force of the vane by the magnetic attraction force between the rotor and the stator. This magnetic attraction force is varied from one rotational portion of the rotor to another according to the number of rotor poles and the stator slots. While the rotor is in rotation, therefore, like the cogging torque of the motor, as many amplitudes as the least common multiple of the number of poles and the number of slots per rotation are repeated. The axial vibration is generated from the relation between the thrust force of the vane and the magnetic attraction force. This vibration is not generated in the absence of displacement between the stator and the rotor, and therefore a structure is conceivable for fixing the position of the rotor in thrust direction. For an increased mechanical friction, however, the mechanical loss is increased for a lower motor efficiency. According to this invention, therefore, the axial vibration is suppressed by changing the structure of the rotor.

According to this invention, based on the various trials, there is provided a permanent magnet motor for driving a fan, in which even in the case where the rotor is displaced from the magnetic center of the permanent magnetic thereof and the stator core by the thrust force of the vane (fan), the amount of magnetization at the end along the thrust direction of the rotary shaft of the permanent magnet is reduced as compared with that at the central portion in such a manner as to reduce the magnetic attraction force, so that the magnetic force is reduced in the presence of a minor displacement. In another method that can be implemented, the diameter at the end of the magnet is reduced as compared with that at the central portion, or the gap magnetic flux density is reduced only at the axial end portion by changing the shape by chamfer, rounding (curving), etc. of the corner. The magnetic attraction force can be reduced in the presence of a minor displacement by employing a material only at the end portion having a different magnetic characteristic such as a small residual magnetic flux density.

As described above, the vibration and noises along axial direction can be reduced by reducing the magnetic attraction force opposite to the thrust force generated by the fan (vane).

Other objects, features and advantages of the invention will become apparent from the following description of the embodiments of the invention taken in conjunction with the accompanying drawings.

DESCRIPTION OF THE EMBODIMENTS

A motor according to embodiments of the invention is described below with reference to the accompanying drawings.

FIG. 1 shows a structure of a permanent magnet used as a rotor of a basic fan motor constituting a fan drive motor according to an embodiment of the invention. In this embodiment, the permanent magnet has four poles. The rotor 1 having the permanent magnet includes a rotary shaft 2. The rotary shaft 2 is assembled directly by the insert-molding means at the center of the rotor 1. Nevertheless, the rotary shaft may alternatively be assembled using the press fitting or bonding method.

Figure 1A:
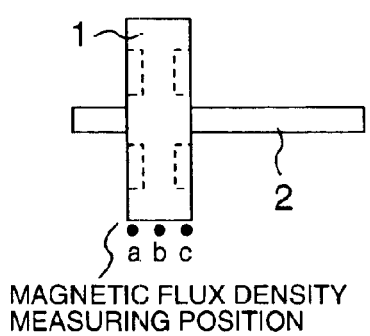
FIGS. 1A to 1D show the distribution of the magnetic flux density of the permanent magnet of a permanent magnet motor for driving a fan according to an embodiment of the invention.

FIG. 1A is a side view of the permanent magnet of the rotor 1. The greater part of the rotor 1 is formed of a permanent magnet which in turn is molded by a die. As indicated by dotted lines, the cross section of the permanent magnet of the rotor has the thickness varied along the direction of thrust. As a result, the magnetic flux density on the surface of the magnet is different at points a, b and c.

Figure 1B:
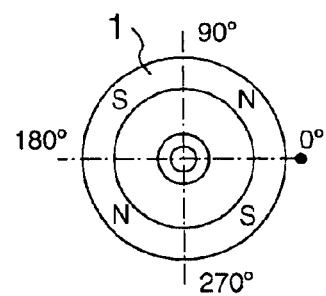
Figure 1C:
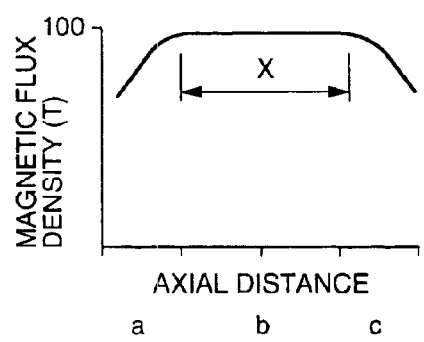
Figure 1D:
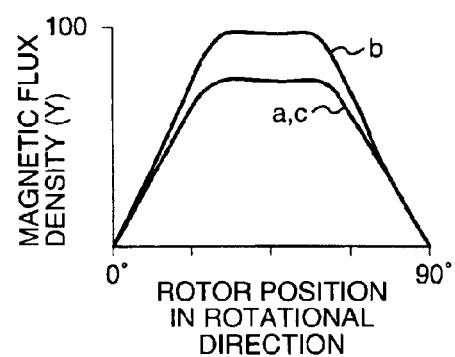

This permanent magnet, as shown in FIG. 1B, has four poles (two pairs of poles), and has the magnetic flux density distribution of one period in the angular range of 0 to 180 degrees. The result of measuring the magnetic flux density distribution along the axial direction is shown in FIG. 1C, and the result of measuring the magnetic flux density distribution in the rotational direction is shown in FIG. 1D. The magnetic flux density distribution, as viewed in an axial direction, is such that assuming that the magnetic flux density in the range X having the axial center at position b is about 100%, the magnetic flux density at positions a and c is as small as 80% or less. The magnetic flux density distribution along the rotational direction, on the other hand, indicates that as shown in FIG. 1D, the peak value at position b is 100%, while the peak value at positions a and c is not more than 80%. In this way, the distribution of the surface magnetic flux density in an axial direction can be changed by changing the thickness along the axial direction of the permanent magnet.

Figure 2:
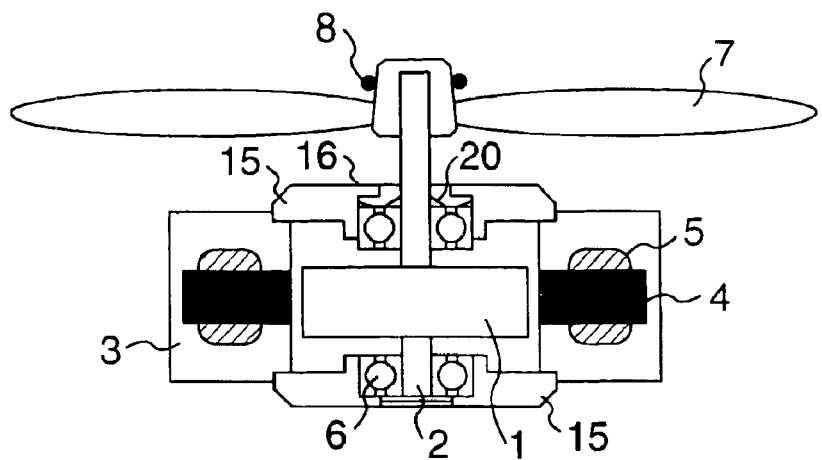
FIG. 2 shows a structure of a permanent magnet motor for driving a fan according to an embodiment of the invention.

The structure of an ordinary permanent magnet motor for driving a fan is shown in FIG. 2. The ordinary permanent magnet motor for driving a fan comprises a stator core 4 having a stator winding 5. This stator core 4 is molded by synthetic resin thereby to produce a resin-molded stator. The stator winding 5 and the stator core 4 are covered with a resin mold portion 3. A rotatable rotor 1 is arranged on the inside of the stator. The rotor 1 has a rotary shaft 2.

End brackets 15, 15 are arranged on both sides of the stator. The end brackets 15, 15 are mounted to fit in the counter lock of the stator.

The end brackets 15, 15 have bearing holding portions. A bearing 6 is supported by the bearing holding portions. The bearing 6 is of ball type and rotated by the rolling of balls interposed between the inner race and the outer race. The rotary shaft 2 is fitted in the inner race of the bearing 6. The outer peripheral side of the outer race of the bearing 6 is fitted on the bearing holding portions, and held in such a manner as to slide along the direction of thrust of the rotary shaft (longitudinal direction along the rotary shaft).

An anti-detachment bank 16 is arranged at the outer end of the bearing holding portions. In one of the bearing holding portions (the upper bearing holding portion in the drawing), a pressure spring 20 is interposed between the anti-detachment bank 16 and the bearing 6. This pressure spring 20 energizes and pushes the bearing 6 along the direction of thrust of the rotary shaft 2. Since the rotary shaft 2 is fitted in the inner race of the bearing 6, the rotor 1 is also energized and pushed along the direction of thrust of the rotary shaft 2. In this way, the rotor 1 is movable to some degree along the direction of thrust of the rotary shaft 2, and kept pressed by the pressure spring 20 in one direction.

The stator 1 has a permanent magnet as described above with reference to FIG. 1. This permanent magnet and the stator core 4 of the stator are magnetically attracted with each other. The rotor movable along the direction of thrust of the rotary shaft is held at a predetermined position by this magnetic attraction force.

The blowing vane 7 (the fan for the axial flow) is mounted at the forward end of the rotary shaft 2 of the rotor 1 and fixed by a stop ring 8.

The greater part of the permanent magnet motor for driving a fan shown in FIG. 3, except for the bearing, has the same configuration as the permanent magnet motor for driving a fan shown in FIG. 2.

The fan driving permanent magnet motor shown in FIG. 2 has a ball bearing 6, while the fan driving permanent magnet motor shown in FIG. 3 has a slide bearing 30.

The slide bearing 30 slidably and rotatably supports the rotary shaft 2 on the inner peripheral portion thereof, and has the outer peripheral portion thereof kept fitted in the bearing holding portions of the end brackets 15, 15. The rotary shaft 2 is slidably and rotatably supported on the inner peripheral portion of the bearing 30, and therefore slidable also along the direction of thrust of the rotary shaft 2. The rotor 1 is thus movable along the direction of thrust of the rotary shaft 2.

Further, the balance between the thrust force of the vane 7 (fan for the axial flow) and the magnetic attraction force of the permanent magnet and the stator core 4 is described below with reference to FIG. 3.

Figure 3A:
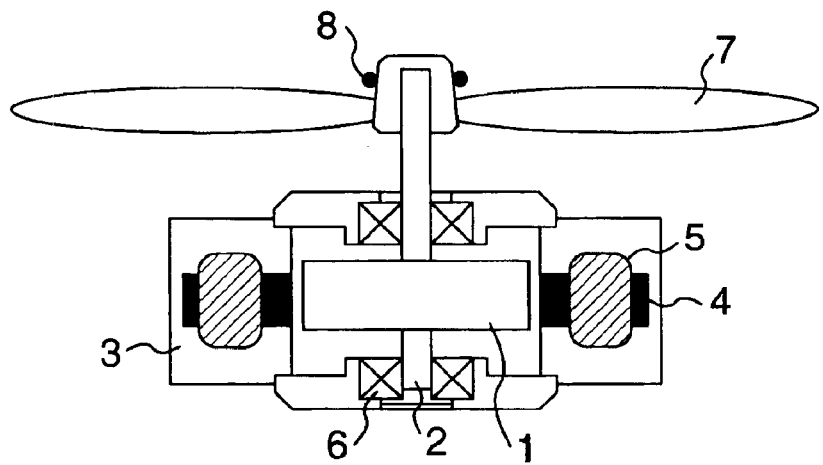
FIGS. 3A and 3B are diagrams for explaining the balance between the thrust force of the vane (fan) and the magnetic attraction force of the permanent magnet and the stator core according to an embodiment of the invention.
Figure 3B:
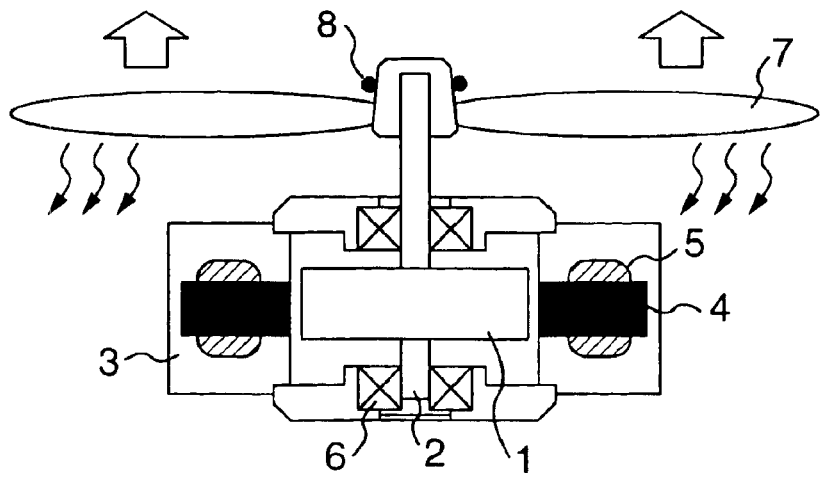

FIG. 3A shows the state where the rotor 1 is stationary, and FIG. 3B shows the state where the rotor 1 is in rotation.

As shown in FIG. 3B, when the rotor 1 rotates and the vane 7 (fan for axial flow) blows the air rearward, the forward thrust force (the force for moving in the direction of thrust of the rotary shaft) of the vane 7 (fan for the axial flow) acts on the rotor 1.

The magnetic attraction force of the permanent magnet and the stator core 4 is exerted against the force of the rotary shaft to move in the direction of thrust, and balanced at a position where both forces are in equilibrium so that the rotor 1 is held stationary at the particular position.

The magnetic attraction force, however, works differently depending on the rotational position of the rotor due to the relation between the number of the stator slots and the number of the poles of the magnet. Even in the case where a constant thrust force of the wind is generated by the vane rotating at a constant rotational speed, therefore, the attraction force acts in the opposite direction repeatedly with an amplitude equivalent to the least common multiple of the number of poles and the number of slots of the stator and the rotor per rotation, thus generating an oscillation in an axial direction. This oscillation causes the unrequired vibration and noises by resonating with the natural frequencies of the motor and the housing on which it is mounted. How to reduce the oscillation of the magnetic attraction force, therefore, is crucial to reduce the vibration and noises of the motor.

Figure 4A:
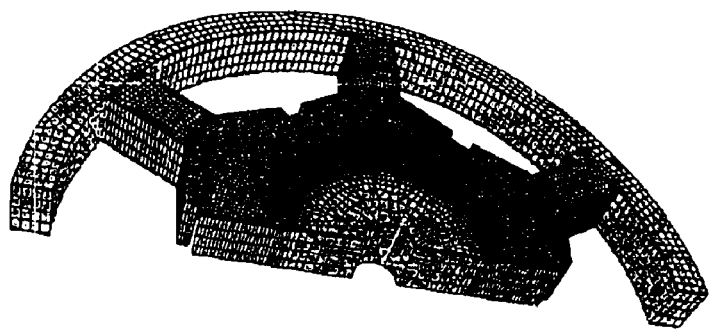
FIGS. 4A to 4C show a FEM mesh structure and other conditions such as the distribution of the magnetic flux density of the rotor magnet to analyze the electromagnetic phenomenon of the permanent magnet motor for driving a fan according to an embodiment of the invention.
Figure 4B:
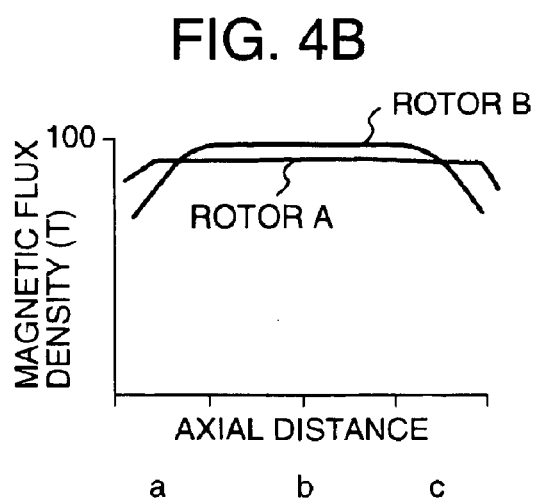
Figure 4C:
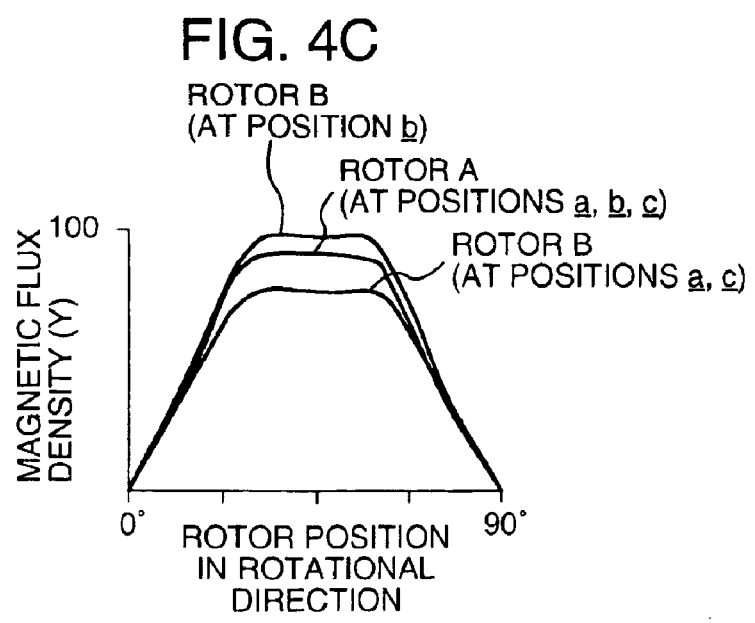

FIGS. 4A to 4C show the conditions for analyzing the force in an axial direction by the magnetic field analysis method (FEM). FIG. 4A shows the mesh division of the rotor and the stator of the motor for FEM analysis. The analysis conditions include the following two cases:

Rotor A: Conditions for securing a predetermined magnetic flux density at points a, b, c in FIG. 1

Rotor B: Conditions for securing a larger magnetic flux density at point b than at points a and c in the structure shown in FIG. 1.

As shown in FIGS. 4B and 4C, the surface magnetic flux density of the rotor A is uniform in an axial direction, and the surface magnetic flux density of the rotor B is set high at the central portion in an axial direction. Also, as viewed in the direction of rotation, the rotor A has the same magnetic flux density distribution at all of the positions a, b and c, while the rotor B has a high magnetic flux density at the central portion thereof. Thus, the peak value is set higher for the rotor B. This is in order to secure the same torque even in the case where the magnetic flux density is low at the ends.

Figure 5:
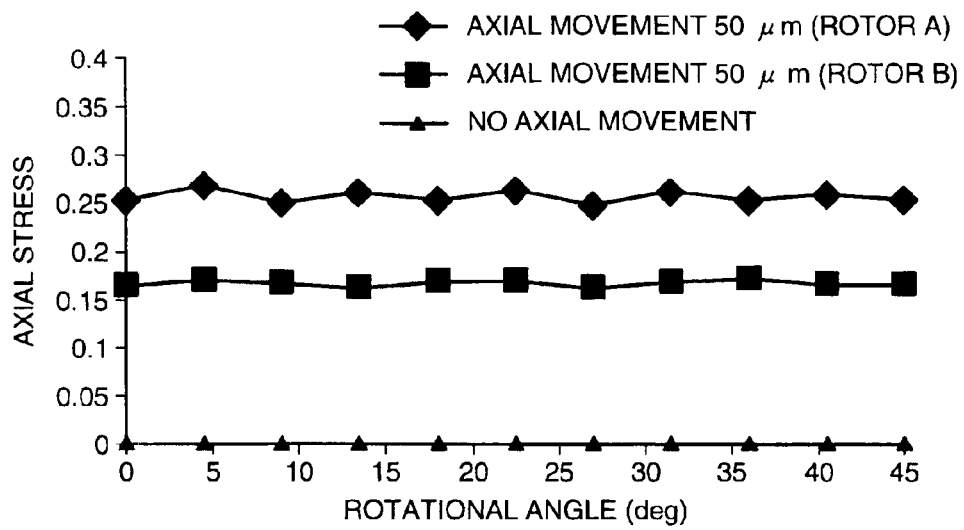
FIG. 5 is a graph showing the result of determining the stress exerted in an axial direction of the rotor by analyzing the magnetic field using the conditions shown in FIG. 4 according to an embodiment of the invention.

FIG. 5 shows the result of FEM analysis. The force exerted along the axial direction of the rotor is generated from neither the rotor A nor the rotor B as long as the rotor position is not displaced from the position magnetically balanced with the stator.

In the case where the rotors A and B are displaced by 50 μm, on the other hand, both generate the magnetic attraction force thereby to generate an oscillation equivalent to the least common multiple of the number of poles and slots of the stator and the rotor. The level of this vibration is larger for the rotor A by about forty percent. Incidentally, the rotational speed output from the motor and the torque thereof are the same. This result shows that the vibration level due to the magnetic attraction force can be reduced more with the configuration of the rotor B for reducing the magnetic attraction force.

Figure 6:
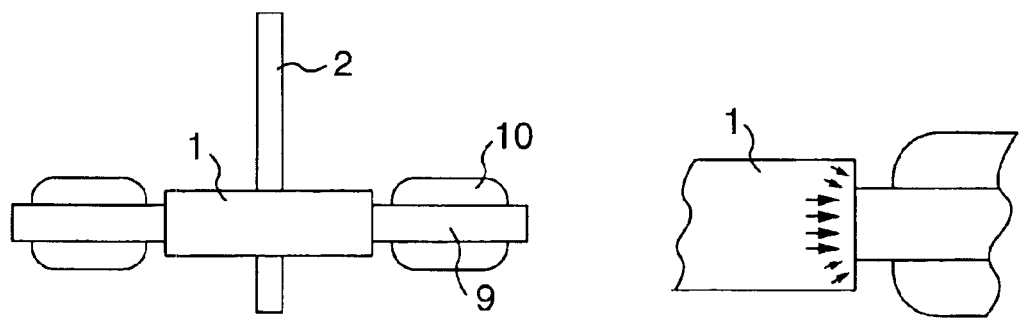
FIG. 6 shows the shape of the magnetizing yoke conforming with the structure of the permanent magnet motor for driving a fan according to an embodiment of the invention.

FIG. 6 shows a structure of the magnetization yoke for reducing the magnetic flux density in an axial direction of the magnet rotor only at the end portion thereof. The thickness in an axial direction of the magnetization yoke is reduced, so that the magnetic fluxes are concentrated at the central portion.

FIGS. 7A to 7D show a method of implementing the axial magnetic flux density distribution with various structures of the rotor magnet.

Figure 7A:
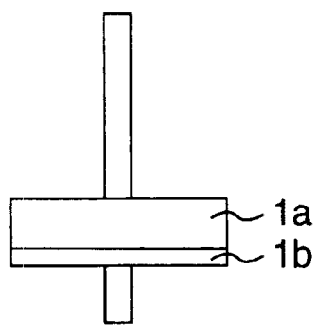
FIGS. 7A to 7D show examples of development of various shapes conforming with the structure of the permanent magnet motor for driving a fan according to the invention.

FIG. 7A shows a structure intended to realize the magnetic flux density distribution of FIG. 1 by employing a plurality of types of magnet materials including a material 1a high in residual magnetic flux density and a material 1b low in residual magnetic flux density which are used differently in an axial direction.

Figure 7B:
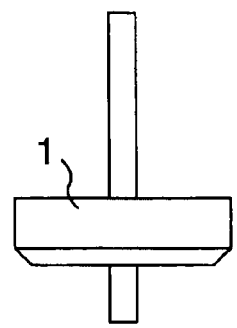

FIG. 7B shows a structure in which the outer diameter of the axial end portion is rendered smaller by chamfering than the outer diameter of the central portion so that the gap between the stator and the rotor is widened to secure a sufficient magnetic attraction force. This method is implemented also by reducing the diameter of the end portion by machining or rounding.

Figure 7C:
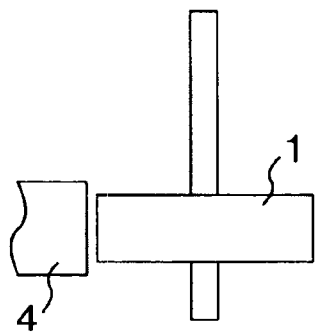

FIG. 7C shows a structure in which the axial thickness of the stator and the rotor are changed in such a manner that the stator is thicker than the rotor to prevent the attraction force from being generated even in the case where the rotor moves in an axial direction under the thrust force.

Figure 7D:
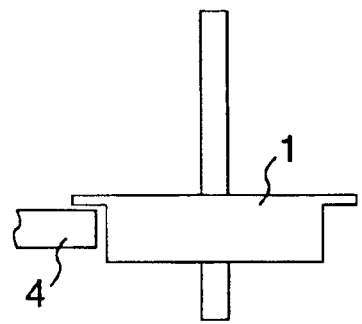

FIG. 7D shows a structure in which a portion in opposed relation to the thrust surface of the stator is formed at the axial end of the rotor magnet, so that the stator and the rotor are kept attracted by the magnetic attraction force along the direction of thrust, thereby preventing the vibration from being caused by the thrust force of the vane.

According to this invention, an inexpensive fan motor very small in vibration and noise and having a high strength, high accuracy and high reliability is obtained without adversely affecting the motor performance.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A permanent magnet motor for driving a fan, comprising:
    a rotor including a permanent magnet;
    a stator including a stator core having a stator winding;
    a bearing for rotatably supporting a rotary shaft of said rotor; and
    a fan arranged on said rotor;
    wherein the fan is rotated while preventing, by a magnetic attraction force of the permanent magnet and the stator core, said rotor moving in a direction of thrust of the rotary shaft with a rotation of said fan; and
    wherein a surface magnetic flux density of the permanent magnet facing the stator core is lower at an end portion than at a central portion of the permanent magnet along the direction of thrust of the rotary shaft.

2. A permanent magnet motor according to claim 1, wherein said permanent magnet motor is configured of magnetic materials having different magnetic characteristics so that the surface magnetic flux density of said permanent magnet facing said stator core is lower at the end portion than at the central portion of said permanent magnet along the direction of thrust of said rotary shaft.

3. A permanent magnet motor according to claim 1, wherein a gap between said permanent magnet and said stator is wider at the end portion than at the central portion in the direction of thrust of said rotary shaft in such a manner that the surface magnetic flux density of said permanent magnet facing said stator core is lower at the end portion than at the central portion of said permanent magnet along the direction of thrust of said rotary shaft.

4. A permanent magnet motor according to claim 1, wherein the motor has an internal rotor, the end portion in the direction of thrust of the rotary shaft constituting an outer peripheral portion of the permanent magnet is chamfered or curved in such a maimer that the surface magnetic flux density of said permanent magnet facing said stator core is lower at the end portion than at the central portion of said permanent magnet along the direction of thrust of said rotary shaft.

5. A permanent magnet motor for driving a fan, comprising:
- a rotor including a permanent magnet;
- a stator including a stator core having a stator winding;
- a bearing for rotatably supporting a rotary shaft of said rotor; and
- a fan arranged on said rotor;
- wherein the fan is rotated while a movement of said rotor in a direction of thrust of the rotary shaft with a rotation of the fan is prevented by a magnetic attraction force of the permanent magnet and the stator core; and
- wherein a thickness of the stator core in the direction of thrust of the rotary shaft is greater than a thickness of the permanent magnet in the direction of thrust of the rotary shaft by an amount substantially equivalent to a displacement of said rotor moved by the thrust with a maximum rotational speed of said fan.

6. A permanent magnet motor according to claim 1, wherein a magnetization yoke smaller in thickness than said permanent magnet in the direction of thrust of the rotary shaft is arranged or molded by a die for orientation molding at an end portion of said permanent magnet in such a manner that a surface magnetic flux density of said permanent magnet facing said stator core is lower at the end portion of said permanent magnet than at a central portion along the direction of thrust of said rotary shaft.

7. A permanent magnet motor according to claim 1, wherein said fan is an axial flow fan.

* * * * *